United States Patent [19]

McHugh et al.

[11] Patent Number: 6,027,758

[45] Date of Patent: *Feb. 22, 2000

[54] RESTRUCTURED FRUIT AND VEGETABLE PRODUCTS AND PROCESSING METHODS

[75] Inventors: Tara H. McHugh, Albany; Charles C. Huxsoll, Moraga, both of Calif.

[73] Assignee: The United States of America as represented by the Secretary of Agriculture, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/918,832

[22] Filed: Aug. 26, 1997

Related U.S. Application Data

[60] Provisional application No. 60/026,181, Sep. 12, 1996.

[51] Int. Cl.[7] .................................................. A23L 1/064

[52] U.S. Cl. ........................... 426/615; 426/102; 426/516; 426/573; 426/575; 426/577; 426/578; 426/640

[58] Field of Search ..................................... 426/516, 102, 426/640, 615, 573, 577, 575, 578

[56] References Cited

U.S. PATENT DOCUMENTS

| | | | |
|---|---|---|---|
| H1053 | 5/1992 | Coffee et al. | 426/516 |
| 3,652,294 | 3/1972 | Marotta et al. | 99/83 |
| 4,436,759 | 3/1984 | Trilling et al. | 426/516 |

(List continued on next page.)

OTHER PUBLICATIONS

McHugh, T. H et al. "Extrusion processing of peach puree-based restructured fruit product", 1996 IFT Annual meeting : book of abstracts, p. 183 ISSN 1082–1236, USDA W. Reg. Res. Cent., 800 Buchanan St. Albany, CA.94 710.

Truong et al. "Sweet Potato Puree", J. of Food Science, 59 (6) 1175–1180, 1994.

C. Mouquet et al., "Texturization of Sweetened Mango Pulp: Optimization using Response Surface Methodology", In: Journal of Food Science, vol. 57:1395–1400 (1992).

G. Kaletunc et al., "Alginate Texturization of Highly Acid Fruit Pulp and Juices", In: Journal of Food Science, vol. 55:1759–1761 (1990).

K. Hannigan, "Structured Fruit", In: Food Engineering p. 48–49 (Mar. 1993).

J.L. Collins et al., "Chemical, Physical and Sensory Attributes of Formed and Frozen, Baked Sweetpotato", In: Journal of Food Science, vol. 60:465–467 (1995).

S.J. Kim et al., "Production of an Extruded Snack Containing Squash and Pinto Beans," Abstract 26H–7, IFT Annual Meeting/Book of Abstracts, p. 86 (1995).

A. Daquino, "Save steps when making licorice, taffy, jellies", In: Candy Industries, p. 38–40/42/44 (Nov. 1985).

M. Werner et al., "Confectionery products begin to rely on twin–screws", In: Extrusion Communique p. 8 (only page available) (Sep. 1992).

M. Vincent, "Extruded Confectionery Equipment and Process", In: Confectionery Manufacture & Marketing, p. 34–36 (Nov. 1984).

H.R. Bolin et al., "Product development and applications for a dry apricot", In: Baker's Digest p. 30–32 (Mar. 1973).

C. Moore, "Formulation and Processing of Fruit Snacks", In: Cereal Foods World, vol. 34:606–617 (Aug. 1989).

(List continued on next page.)

*Primary Examiner*—Helen Pratt
*Attorney, Agent, or Firm*—M. Howard Silverstein; Nancy J. Parsons; Margaret A. Connor

[57] ABSTRACT

Value-added, restructured fruit and vegetable products made from bulk-processed ingredients are taught. The restructured fruit and vegetable products are to be eaten out-of-hand as confectionery items or incorporated into baked, canned and/or frozen foods, such as cereals, cookies, cakes, fruit cocktails and ice creams. Processing methods involving twin-screw extrusion used to obtain the restructured fruit and vegetable products are also taught.

6 Claims, 8 Drawing Sheets

Effect of Moisture Content on the Color of Extruded 100% Peach Puree Gels

U.S. PATENT DOCUMENTS

| | | | |
|---|---|---|---|
| 4,837,112 | 6/1989 | Calandro et al. | 426/463 |
| 5,084,296 | 1/1992 | Lugay et al. | 426/516 |
| 5,252,351 | 10/1993 | Cox et al. | 426/549 |
| 5,296,253 | 3/1994 | Lusas et al. | 426/629 |
| 5,300,312 | 4/1994 | Lusas et al. | 426/634 |
| 5,549,921 | 8/1996 | Robinson et al. | 426/516 |
| 5,750,181 | 5/1998 | Greff | 426/615 |

OTHER PUBLICATIONS

J. Maga et al., "Co–extrusion of Rice Flour with Dries Fruits and Fruit Juice Concentrates" In: (Food Science and Technology, vol. 22:182–187 (1989).

J.C. Acton et al., "Protein Quality Evaluation of Drum Dried and Dried–Extruded Peanut Products", In: Food Science & Technology, vol.16:5–7 (1983).

RESTRUCTURED FRUIT AND VEGETABLE PRODUCTS AND PROCESSING METHODS

CROSS REFERENCE TO RELATED APPLICATIONS

This application hereby claims the benefit of U.S. provisional patent application Ser. No. 60/026,181, filed Sep. 12, 1996, the contents of which are incorporated by reference herein.

BACKGROUND OF THE INVENTION

1. Field of the Invention

The invention relates to methods of restructuring bulk-processed fruits and vegetables utilizing drum drying and extrusion, and products made by such methods.

2. Description of the Art

Research on structured fruit products began in the 1940's with a process using alginates for the formation of structured cherries. Droplets, containing cherry puree and alginate, were dropped into a bath of calcium salt to form a skin. Alginate based structured fruits offer the advantage that they are not affected by heat; therefore, these cherries could be used in baked goods (Peschardt, U.S. Pat. No. 2,403,547 1942).

During the 1960's and early 1970's the USDA began to develop structured fruit products. Gelled applesauce, similar to cranberry sauce, was produced in an effort to increase utilization of process-grade apples. Gelled applesauce contained golden delicious apples, sucrose, low-methoxyl pectin, citric acid, calcium lactate and water. The product was marketed mainly as an adjunct to pork, as cranberry is to turkey (Lazar and Morgan, *Food Technology* March: 52–53, 1964). Several years later, prunes and other dried fruits were gelled using low-methoxyl pectin. These gelled sauces could then be used in bakery goods, cereals, mixes, etc. (Bolin and Nury, *Canner/Packer* May, 1967). In another study, apricot concentrate was formed into fruit "sheets of cloth" using a drum drier. The cloth was pressed into cubes, artificial halves and bars for use in a variety of food products. Consumers recommended increasing product moisture content and sweetness to improve acceptability (Bolin, Fuller et al., *The Bakers Digest* March: 30–32, 1973; Bolin, Turnbaugh et al., *The Bakers Digest* August: 24–25, 1974).

The properties of structured fruits were studied in the late 1970's and early 1980's. These gels simulated fruit texture, but did not contain any fruit. Simulated fruit gels suitable for freeze dehydration were produced. Freeze dried gels were formed using a two step process in which a gelatin containing sodium alginate gel was cooled, sliced and placed in a calcium lactate solution for crosslinkage. When evaluated in yogurt and jello, rehydrated gels scored as well organoleptically as most fresh fruits, with the exceptions of banana and pineapple (Luh, Karel et al., *Journal of Food Science* 41:89–93, 1976). Later Karel correlated the compressive break strength and fracture energy density of calcium alginate gels with sensory properties. The effects of pectin, gelatin and sucrose on textural properties were also evaluated. The Instron Universal Testing Machine was capable of detecting smaller differences in sample mechanical properties than sensory panelists. Results indicated that pectin improved the sensory acceptability of simulated fruits. The two step method for formation of simulated fruit gels was later improved to increase retention of water soluble components such as ascorbic acid (Luh, Flink et al., *Journal of Food Science* 42(4):976–981, 1977). A one step procedure using glucono-delta-lactone and dicalcium phosphate dihydrate was developed, eliminating residence in the crosslinking bath (Pelaez and Karel, *Journal of Food Processing and Preservation* 5:63–81, 1981).

In the 1980's, the three processing methods for the formation of structured fruits from alginates were defined as internal setting, diffusion setting and setting by cooling. Internal setting involves calcium ion release from within the system at room temperature and produces structured fruits with uniform texture. Diffusion setting allows calcium ions to diffuse into the alginate matrix and produces structured fruits with an outer skin and a liquid center. Co-extrusion may also be used to accomplish diffusion setting. The third method involves setting by cooling where gelled ingredients are dissolved in hot water and later set by cooling (Hannigan, *Food Engineering* March: 48–49, 1983).

Novel expanded snacks were formed in the late 1980's by co-extrusion of rice flour with dried fruits and fruit juice concentrates. A Brabender laboratory extruder was used in this study. Extruded snacks exhibited comparable yield and sensory properties compared to extrudate made exclusively from rice. The juices performed better than the dried fruit in regards to expansion. Citric acid addition did not significantly improve extrudate properties with the exception of improved color retention (Maga and Kim, *Lebensm.-Wiss. U.-Technol.* 22(4):182–187, 1989).

In the past few years, A. Nussinovitsch has performed several studies on the formation and properties of structured fruits. In the first study, apple pulp and reconstituted grapefruit juice were added to calcium alginate gels at concentrations of 5–96% (Kaletunc, Nussinovitsch et al., *Journal of Food Science* 55(6):1759–1761, 1990). The mechanical properties of the resultant gels were characterized. This work was the first to incorporate such high concentrations of fruit pulp to gels. In another study, raspberry pulp was added to calcium alginate gels with and without the addition of agar (Nussinovitsch and Peleg, *Journal of Food Processing and Preservation* 14:267–278, 1990). Agar did not improve product strength, but did increase brittleness and stiffness. Nussinovitsch also investigated the mechanical properties of gel-pulp-sugar composite products formed from various hydrocolloids (agar, carrageenan and alginate), a wide range of sugar concentrations, and various fruit pulps (orange, banana, and apricot) in order to identify means of producing structured fruits with a desired consistency (Nussinovitsch, Kopelman et al., *Lebensm-Wiss. U.-Technol.* 24:513–517, 1991). Sugar addition strengthened gels up to a maximum point after which gel strength was reduced. Fruit pulp, on the other hand, weakened gel strength down to a minimum point after which the gel system regained strength. Size reduction increased strength. Models were later developed to quantitate the combined effect of fruit pulp, sugar and gum on the mechanical properties of agar and alginate gels (Nussinovitsch, Kopelman et al., supra, 1991).

Recently, two studies concerning structured fruit products were published. Response surface methodology was used to optimize the texture of a sweetened mango pulp-alginate structured fruit product. Structured mango was formed with 90% fruit pulp. This study also developed a method for evaluating the thermostability of textured fruits (Mouquet, Dumas et al., *Journal of Food Science* 57(6):1395–1400, 1992). A group from Saudi Arabia formed prickly pear sheets from fruit pulp, sucrose, citric acid, sodium metabisulphite and olive oil. These sheets were highly acceptable to a small sensory panel and could be marketed as an alternative to apricot sheets (Ewaidah and Hassan, *International Journal of Food Science and Technology* 27:353–358, 1992).

In the past, the formation and properties of restructured vegetable products have not been investigated. However, recent research projects have evaluated the formation and properties of restructured sweet potato products. Collins et al., *Journal of Food Science* 60(3):465–467, (1995) formed sweet potato pieces by stuffing baked sweet potato into cellulose casings and subsequently freezing the product. Troung et al., *Journal of Food Science* 60(5):1054–1059, (1995) formed restructured sweet potato products in a similar fashion, with the addition of alginate and various salts. Products from both studies exhibited acceptable color, flavor and texture. Kim and Maga, *IFT 95 Book of Abstracts* 25H-7, (1995) recently produced a snack containing squash and pinto beans.

Most current commercial products and processes utilize only a small percentage of dried fruit, fruit juice concentrate, fruit powder or fruit puree in the final product. The major ingredients are sugars, starches, gels and gums. Molded fruit pieces made with dried plum paste, glycerin, oat fiber and citrus fiber are available commercially. Extruded fruit pieces made from sugar, soybean oil, soy protein, cellulose gum, and natural and artificial colors and flavors are also available commercially. Restructured vegetable products are not available in the current marketplace.

SUMMARY OF THE INVENTION

It is the prime objective of the invention to provide value-added, restructured fruit and vegetable products made from bulk-processed ingredients, to be eaten out-of-hand as confectionery items or incorporated into baked, canned and/or frozen foods, such as cereals, cookies, cakes, fruit cocktails and ice creams.

The USDA Food Guide Pyramid advises mature adults to consume 3–5 servings of vegetables and 2–4 servings of fruit per day. Because consumers wish convenience and variety in their food products, there is a need to provide fruit and vegetable products in different forms so that the dietary goals are more likely to be attained. The use of value-added, restructured fruit or vegetable products would increase utilization and consumption of fruits and vegetables.

Often fruit and vegetable crops have short harvest seasons, so that large amounts of material must be processed during a short period, further limiting the kinds of products that may be made. There is a need to develop processing systems in which large amounts of materials may be partially processed into a stable forms within a short harvest season, and subsequently made into a variety of desirable final products throughout the remainder of the year. Various systems already exist for partially processing fruits and vegetables in bulk. These include aseptically processed fruit and vegetable purees, aseptically processed piece-form products, such as slices, and dehydrated and dehydrofrozen materials. Of these, aseptically processed concentrated purees are the least costly to produce. However, at present the market for concentrated purees is very limited. Typically, off-grade fruits and vegetables or high quality fruits and vegetables that are in excess of that needed for canning, freezing, or other processing is made into concentrated puree. It is often a salvage operation. Concentrated purees are utilized in juice drinks, nectars, baby food, and some sauces.

The restructured fruit or vegetable products of the invention are made with concentrated fruit and/or vegetable puree as the primary starting material. Further bulk-processed products such as clarified syrups, highly concentrated purees, drum dried films, spray dried purees, and piece-form materials, such as dried, dehydrofrozen, and aseptically processed dices and slices are incorporated into the products to provide unique textural and flavor qualities.

It is a further object of the invention to provide a convenient and efficient method for preparing such fruit or vegetable products. The method incorporates extrusion technology, which is primarily used for the production of breakfast cereals, snack foods, pet foods and the production of synthetic polymers. Advantages of extrusion include continuous processing, enhanced hygiene, lower energy needs, and enhanced control. The combination of drum drying and twin-screw extrusion allows for the production of 100% fruit products.

DETAILED DESCRIPTION OF THE INVENTION

The invention comprises restructured fruit and vegetable products produced from bulk-processed ingredients. The invention will be described for fruit products with the understanding that the invention applies equally to vegetables.

One hundred percent fruit puree products were formed using twin-screw extrusion. Fruit puree was drum dried prior to extrusion to enable the formation of 100% fruit products. Various gelling agents such as starch, gelatin, alginate, pectin and gellan gum may be incorporated to provide the desired structure in the final product. Using different dies, the fruit products can be formed in a variety of shapes and sizes.

A Haake-Leistritz co-rotating, twin screw extruder rheometer was used for the continuous production of restructured fruit. The temperature profile within the extruder barrel was manipulated and monitored to achieve the desired results. The characteristics of the final product can be manipulated by varying the temperature of the extrudate. At lower temperatures, added starch remains ungelatinized, resulting in a more dense product. As the temperature increases, adhesiveness and cohesiveness of the product increases. As the product temperature increases, the texture changes from soft and dense to a light, puffed state. Product temperatures above 100° C. result in crisp, puffed restructured fruit and vegetable products, whereas product temperatures below 100° C. result in softer, denser products. The pressure build-up within the barrel was monitored. Ingredients can be added to the extruder using a gravimetric feeder or through the use of pumps into any point within the extruder barrel. Haake's computer-controlled torque rheometer was employed for complete characterization of the flow properties and processing characteristics of the food for final product optimization.

Final restructured fruit and vegetable product properties were determined in the following manner. The water activities of the final fruit and vegetable pieces were tested using an AquaLab CX2 water activity meter. Moisture contents were determined either by vacuum oven drying or using a Karl Fisher titrator. Color was monitored through the use of a Minolta colorimeter. Texture profile parameters such as hardness, springiness, adhesiveness and cohesiveness were determined using a cyclic method developed on an Instron Universal Testing machine.

Sensory evaluations may be employed to evaluate the color, flavor and odor of the final restructured pieces. Fruit and vegetable piece flavor and odor compounds may be further characterized using a HP-6890 gas chromatograph-mass spectrometer. Scanning electron microscopy may be employed to examine the microstructure of the restructured pieces. Rapid methods of analysis, such as Near Infrared Analysis (NIRA), may provide potential users with methods to monitor the processes and apply advanced processing control, such as Statistical Process Control (SPC), in manufacturing operations. Neural Network theory may be applied for data analysis and model development.

Any fruits and vegetables, either alone or in combination, may be used in the invention. Possible combinations include, but are not limited to, carrot and sweet corn, cranberry and raspberry, banana and strawberry, pear and broccoli, pear and celery, and mango and red bell pepper.

EXAMPLE 1

Materials.

This example describes the production of restructured peaches containing 100% fruit other than added water. Yellow cling peach puree concentrate was used in liquid and dried forms. The dried form was dried in a double drum drier to approximately 6% moisture content. Drum dried puree was ground in a food processor.

Extrusion conditions.

A Haake-Leistritz co-rotating twin screw extruder equipped with a 18 mm barrel diameter and a barrel length to diameter ratio of 30:1, with six barrel sections, was used. The extruder was driven by a torque rheometer. Barrel temperature profiles ranged from 60,65,65,65,50,30° C. to 60,95,105,95,40,40° C. for the six sections. Dry ingredients were fed into the first section and liquid ingredients such as water, sugar solutions or fruit juice concentrates were fed into the second section. Melt temperatures were monitored in the final barrel section and in the die where melt pressure was also determined. Screw speeds ranged from 100 to 150 rpm.

EXAMPLE 2

Materials.

This example describes the production of restructured peaches with added starch. Yellow cling peach puree concentrate was used in liquid and dried forms. The dried form was dried in a double drum drier to approximately 6% moisture content. Drum dried puree was ground in a food processor. As desired, 0–30% high amylose corn starch and 0–65% corn syrup or cane sugar solution (0–65% of the liquid ingredient) was added and 0.25% water was sprayed into the mixture while stirring. Fruit juice concentrates may be used instead of sugar solutions.

Extrusion conditions.

The conditions described in EXAMPLE 1 were used with the barrel temperature profile of 60,95,105,95,40,40° C. to achieve a product temperature of 80° C. Under these conditions, the starch was gelatinized.

EXAMPLE 3

Materials.

This example describes the production of restructured peaches with added starch under conditions in which the starch remains ungelatinized and acts as a filler in the final product. Yellow cling peach puree concentrate was used in liquid and dried forms. The dried form was dried in a double drum drier to approximately 6% moisture content. Drum dried puree was ground in a food processor. As desired, 0–30% high amylose corn starch, thereby producing restructured peaches containing 70–100% fruit other than added water 0–65% corn syrup or cane sugar solution (0–65% of the liquid ingredient) was added and 0.25% water was sprayed into the mixture while stirring.

Extrusion conditions.

The conditions described in EXAMPLE 1 were used with the barrel temperature profile of 60,65,65,65,50,30° C. to achieve a product temperature of 55° C., which resulted in the starch remaining ungelatinized.

Measurements.

Figure 1:
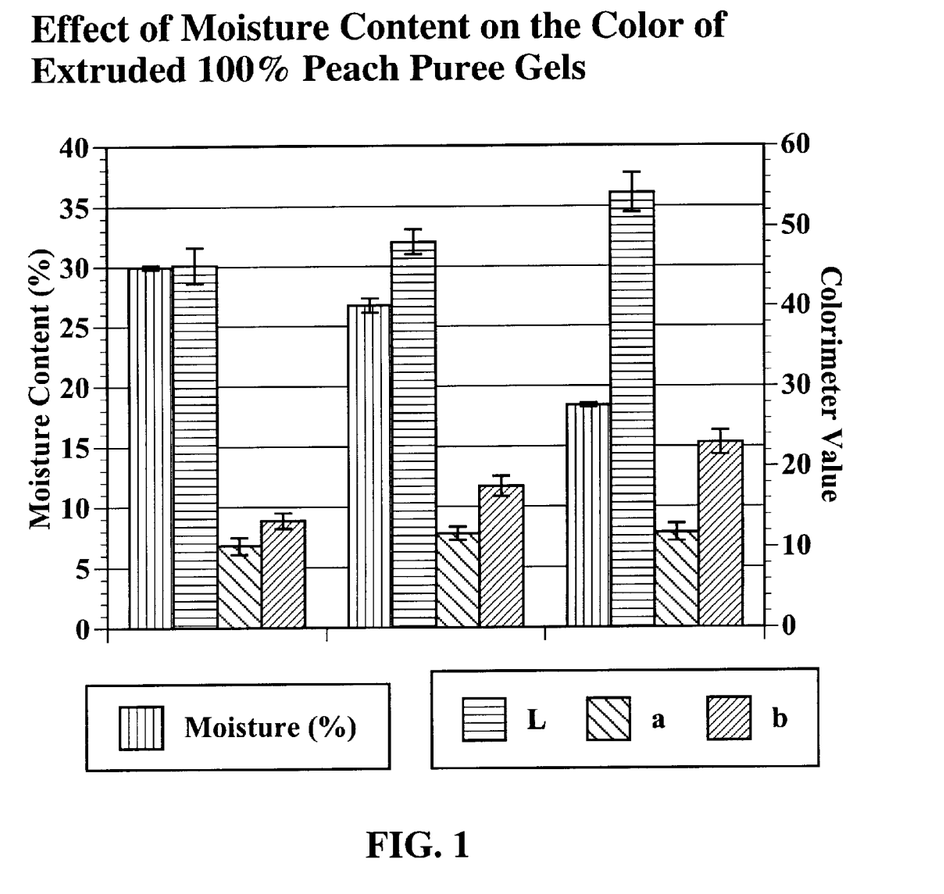
FIG. 1 is a graph showing the effect of moisture content on the color of extruded 100% peach puree gels.
Figure 2:
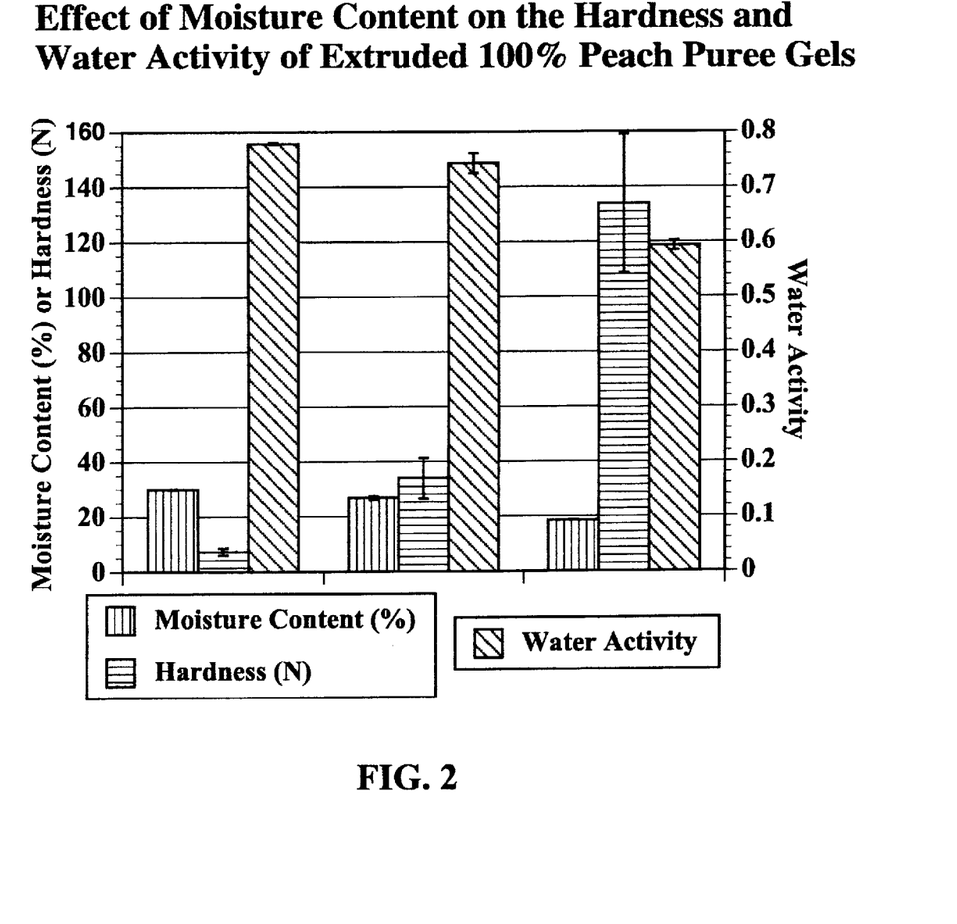
FIG. 2 is a graph showing the effect of moisture content on the hardness and water activity of extruded 100% peach puree gels.

The following measurements were performed on the products from each example. Moisture content was determined using traditional vacuum oven tests performed at 75° C. (FIG. 1 and FIG. 2). Water activity was determined using a Decagon AquaLab CX2 meter. A Minolta calorimeter was employed to measure lightness (L), redness (a) and yellowness (b) values on ground extruded samples (FIG. 1). The Series XII Software and an Instron 4502 was utilized to analyze texture profile parameters. Sample dimensions were 10 mm diameter by 15 mm high. Samples were compressed at 12 mm/min to 80% of their original height. Two compression cycles were performed and the data was analyzed for hardness, adhesiveness, cohesiveness and springiness values. Specific mechanical energy (SME) values were calculated on smoothed torque data.

$$SME = \frac{(\text{Torque} \times \text{Screw Speed})}{\text{Feed Rate}}$$

Moisture content exhibited a great effect on all product properties. For 100% peach puree extruded gels, as moisture content decreased, product lightness (L), redness (a) and yellowness (b) values increased significantly. Moisture content reduction also resulted in significant decreases in water activity and significant increases in product hardness.

Figure 3:
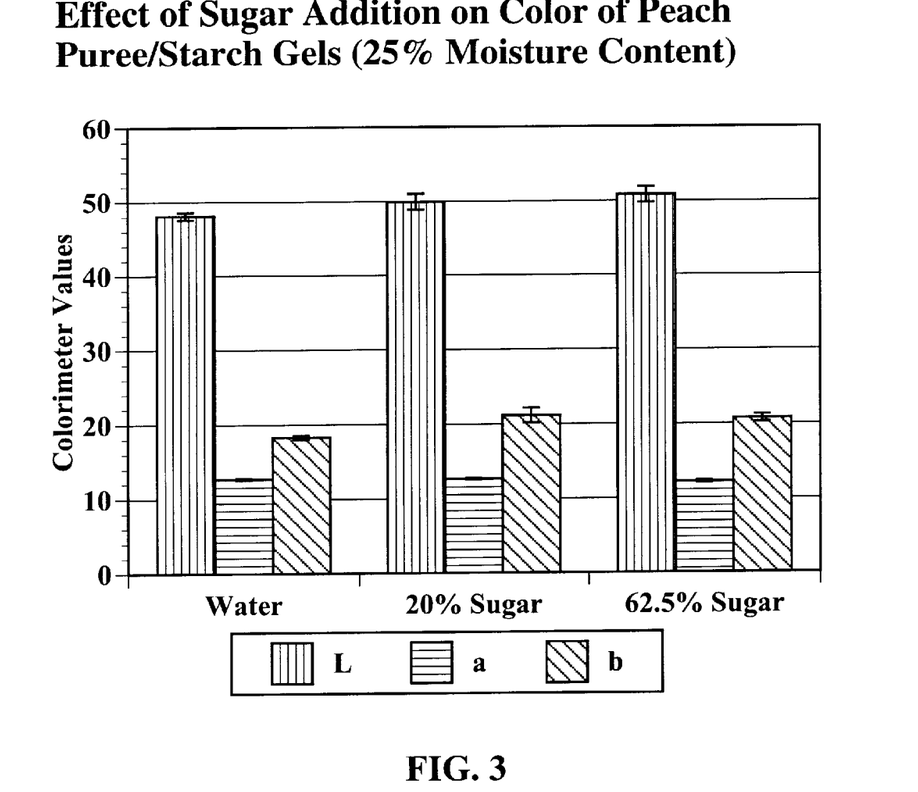
FIG. 3 is a graph showing the effect of sugar on the color of peach puree/starch gels.
Figure 4:
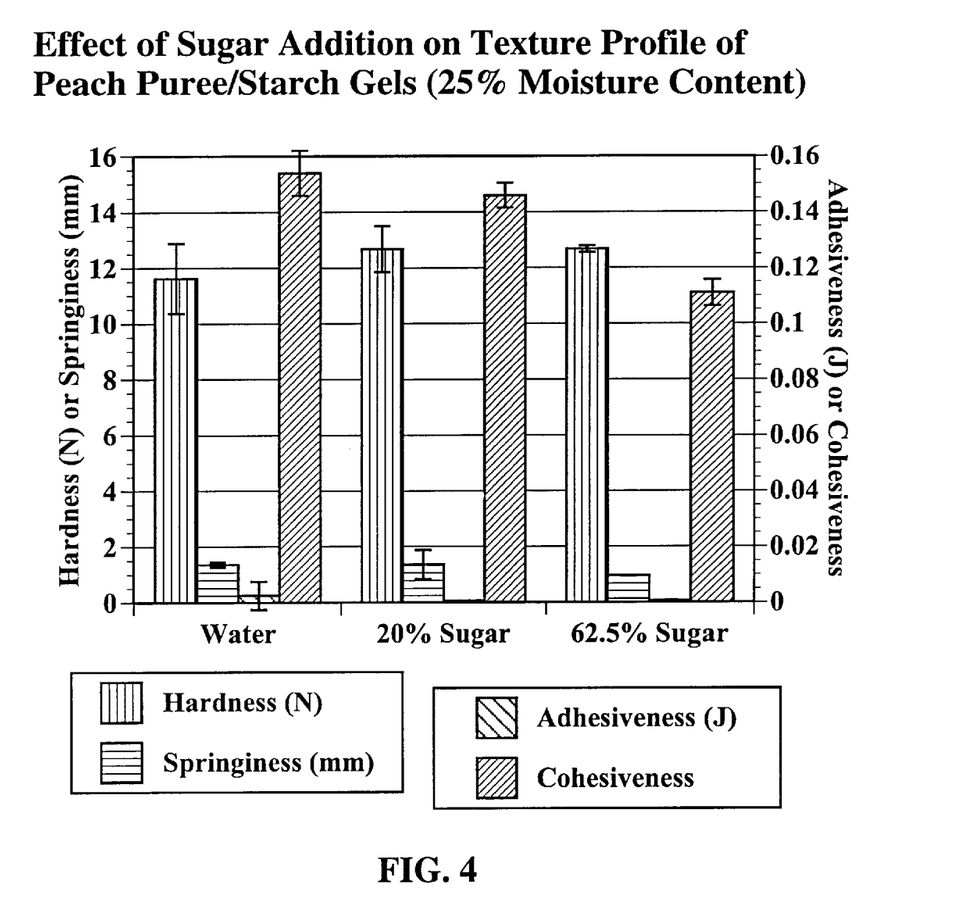
FIG. 4 is a graph showing the effect of sugar on the texture profile of peach puree/starch gels.

Sugar addition, either corn syrup or cane sugar, resulted in increased L, a and b values when the moisture content was equivalent. Product color improved significantly as more sugar was added (FIG. 3). Sugar addition had no significant effect on product hardness, springiness or cohesiveness. Product adhesiveness decreased significantly with increasing sugar concentrations (FIG. 4).

Figure 5:
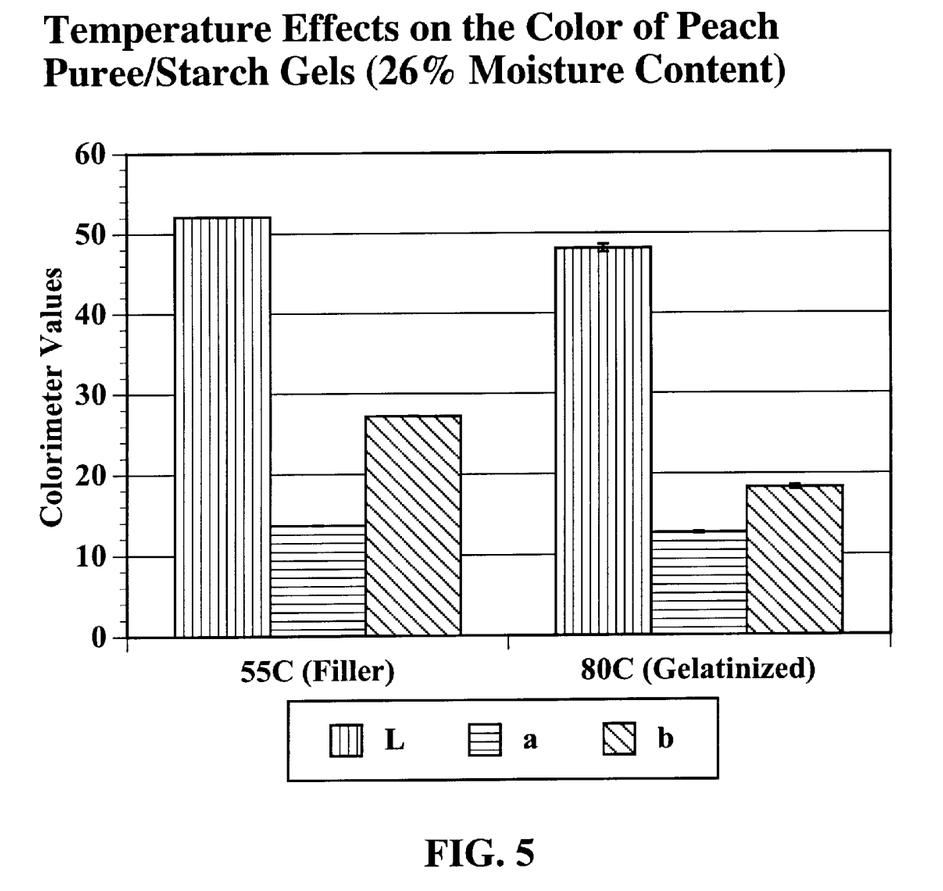
FIG. 5 is a graph showing the effect of temperature on the color of peach puree/starch gels.
Figure 6:
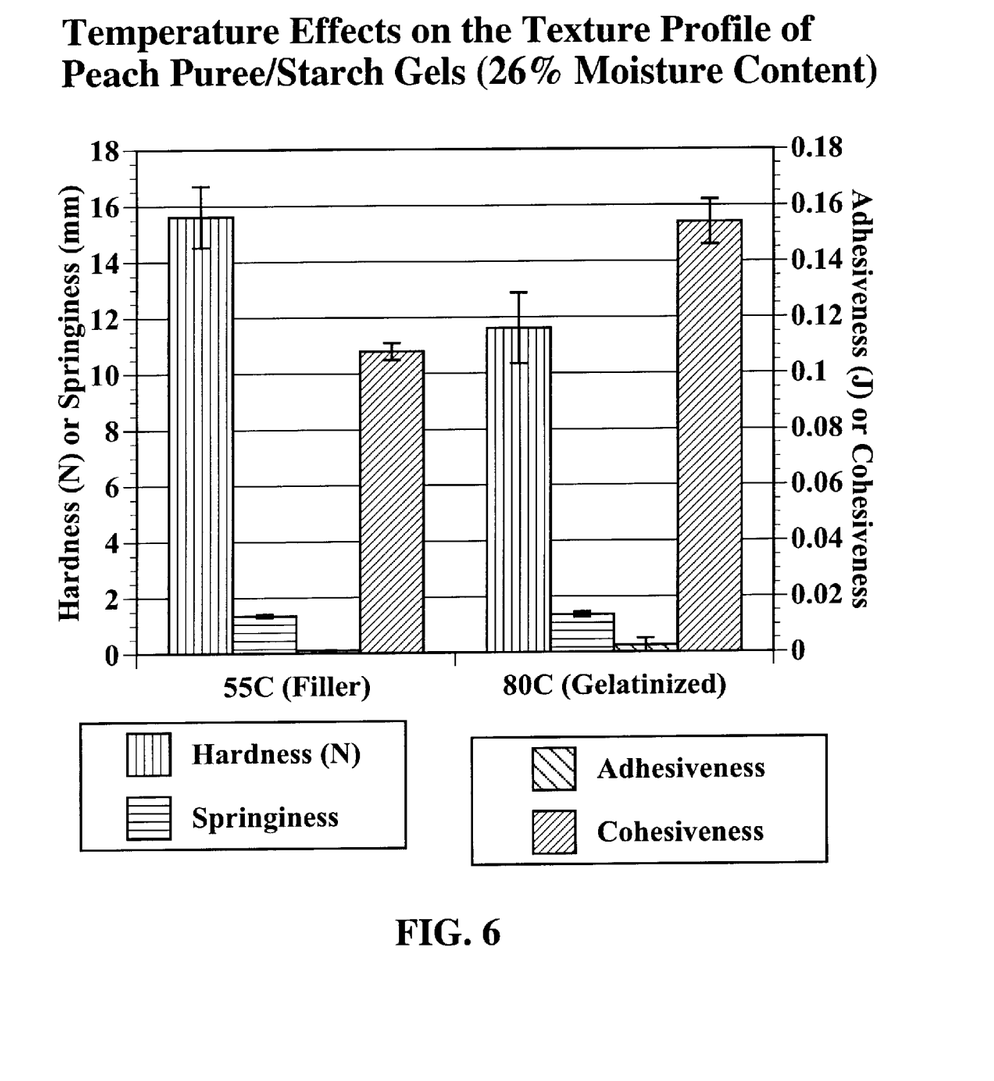
FIG. 6 is a graph showing the effect of temperature on the texture profile of peach puree/starch gels.

Tests were performed at two temperature ranges with added starch. At a product temperature of 55° C. the starch remained ungelatinized and acted as a filler in the final product. At a product temperature of 80° C. the starch was fully gelatinized. Equivalent moisture content gels were compared. Peach puree/starch gels containing gelatinized starch exhibited significantly lower L, a and b values, due to their higher process temperatures (FIG. 5). Hardness was significantly greater in ungelatinized gels. Springiness was not significantly different. Adhesiveness and cohesiveness increased significantly as temperature increased (FIG. 6).

Figure 7:
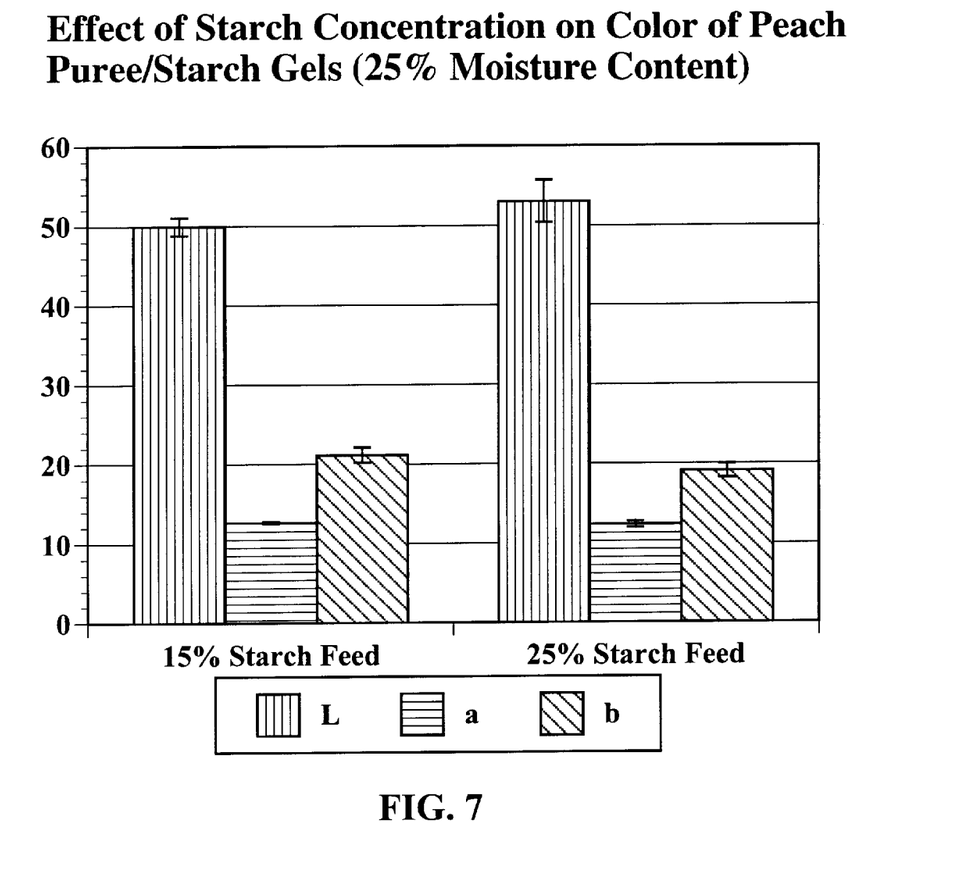
FIG. 7 is a graph showing the effect of starch concentration on the color of peach puree/starch gels.
Figure 8:
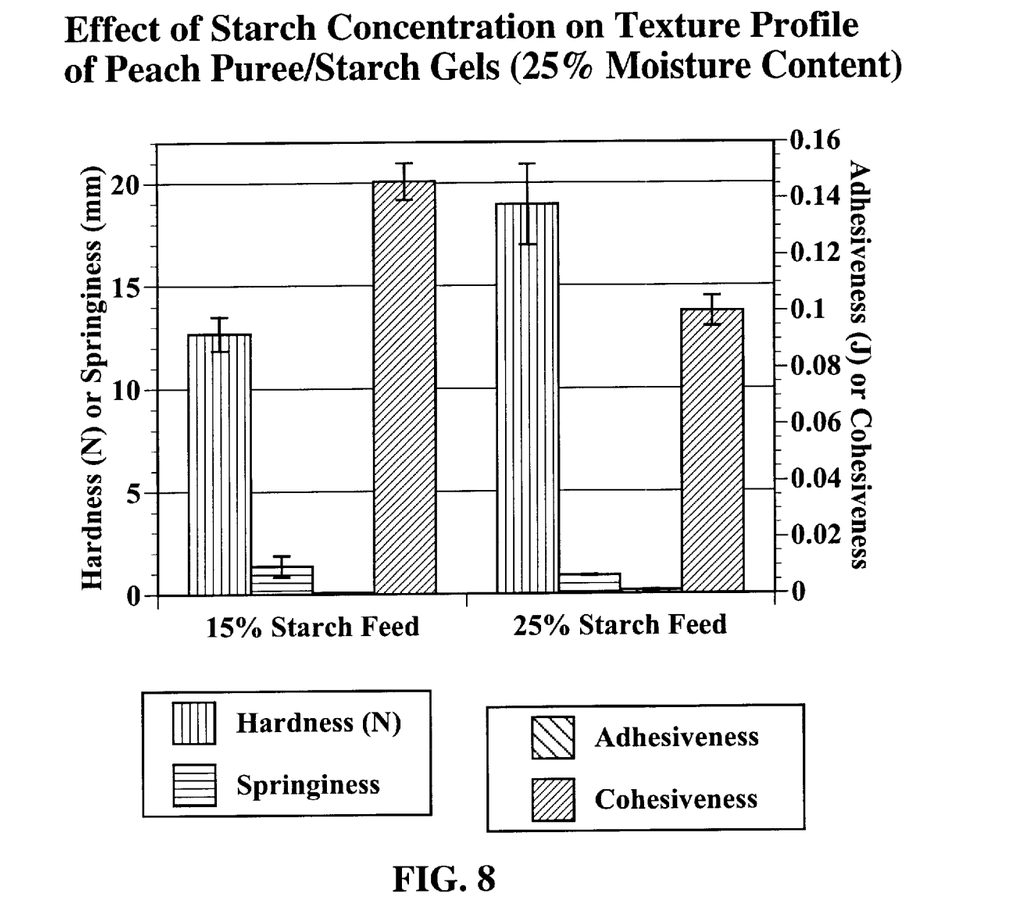
FIG. 8 is a graph showing the effect of starch concentration on the texture profile of peach puree/starch gels.

Increasing concentrations of starch in the extruder feed led to more rapidly setting gels upon exiting the extruder. No significant change in color was observed as starch concentration varied (FIG. 7). Product hardness and adhesiveness increased with increasing concentrations of starch; whereas, product cohesiveness decreased (FIG. 8).

As the specific mechanical energy (SME) during extrusion increased, product hardness increased. SME could be used as an initial indication of product hardness.

Extruded fruit products were made of up to 100% fruit puree. Starch can be added to these gels to improve their functional properties. Extruded fruit and vegetable products such as these can be consumed as healthy alternatives to be eaten out of hand or as ingredients to be added to baked and frozen food products, such as muffins, cookies and ice cream.

It is understood that the foregoing detailed description is given merely by way of illustration and that modification and variations may be made therein without departing from the spirit and scope of the invention.

We claim:

1. A restructured fruit, vegetable or fruit and vegetable product, which product consists essentially of 70–100% of a dried bulk processed fruit, vegetable, or fruit and vegetable ingredient selected from the group consisting of drum dried puree, spray dried puree, and piece formed dried pieces, wherein said product has a water activity of 0.58 to 0.78.

2. The restructured product of claim 1 which further includes a gelling agent selected from the group consisting of starch, gelatin, alginate, pectin, and gellan gum.

3. The restructured product of claim 1, which product consists essentially of 100% of a dried bulk processed fruit, vegetable, or fruit and vegetable ingredient selected from the group consisting of drum dried puree, spray dried puree, and piece formed dried pieces.

4. A process for preparing a restructured fruit, vegetable, or fruit and vegetable product, which consists essentially of,
   (1) combining in a twin screw extruder,
      (a) a dried bulk processed fruit, vegetable, or fruit and vegetable ingredient comprising 70–100% fruit, vegetable, or mixtures thereof, said ingredient selected from the group consisting of drum dried puree, spray dried puree, and piece formed dried pieces, and
      (b) a liquid ingredient, and
   (2) extruding a combined product having 70–100% fruit, vegetable, or mixtures thereof, wherein said product has a water activity of 0.58 to 0.78.

5. The process of claim 4 wherein said liquid ingredient is water, sugar solution, juice concentrate, liquid puree, or clarified syrup.

6. The process of claim 4 wherein said liquid ingredient is in an amount to provide a combined extruded product having a water activity of 0.58 to 0.78.

* * * * *